United States Patent [19]

Rutledge

[11] 4,065,434
[45] Dec. 27, 1977

[54] METHOD OF PREPARING HIGH MOLECULAR WEIGHT POLYPHENOXY ETHERS FROM ALKYL PHENOLS

[75] Inventor: Thomas F. Rutledge, Wilmington, Del.

[73] Assignee: ICI Americas Inc., Wilmington, Del.

[21] Appl. No.: 758,827

[22] Filed: Jan. 12, 1977

[51] Int. Cl.$^2$ .............................................. C08G 65/44
[52] U.S. Cl. .............................. 260/47 ET; 252/463; 252/465
[58] Field of Search .................. 260/47 ET, 396 R; 252/465, 463

[56] References Cited

U.S. PATENT DOCUMENTS 3,549,670  12/1970  Spousta ................................. 260/396
3,787,358  1/1974  Nishioka et al. ................. 260/47 ET Primary Examiner—Lester L. Lee

[57] ABSTRACT

An improved method of preparing high molecular weight polyphenoxy ethers from alkyl phenols is disclosed. The method involves contacting a solution of an alkyl phenol in the presence of an alkaline material and an oxygen carrying gas with a catalyst comprising activated or precipitated alumina supporting mixed oxides of manganese, chromium, and copper in which the metals are present in an amount of 5 to 25 percent chromium, 3 to 15 percent copper based on the total weight of the catalyst and in which the weight ratio range of manganese to chromium is 1.9–0.9 to 1. The method may optionally include the use of an amine.

17 Claims, No Drawings

METHOD OF PREPARING HIGH MOLECULAR WEIGHT POLYPHENOXY ETHERS FROM ALKYL PHENOLS

BACKGROUND OF THE INVENTION

1. Field of the Invention

The present invention concerns an improved method of preparing high molecular weight polyphenoxy ethers from alkyl phenols. More particularly, the invention relates to a method of preparing high molecular weight polyphenoxy ethers by contacting a solution of an alkyl phenol with oxygen or an oxygen containing gas in the presence of an alkaline material selected from the group consisting of alkali metal hydroxides, alkali metal carbonates, and alkali metal bicarbonates and a catalyst system comprising an activated or precipitated alumina support on which are deposited mixed oxides of manganese, chromium and copper.

2. DESCRIPTION OF THE PRIOR ART

It is now well know that alkyl-substituted phenols can be oxidized to yield in general self-condensation products including diphenoquinones and polyphenoxy ethers.

In preparing these materials, a variety of catalysts have previously been sugggested including several types of manganese catalysts. The use of manganese catalysts in combination with other compounds is also known in the art. For example, the use of a manganese catalyst in phenol oxidation was disclosed in U.S. Pat. No. 3,825,521 issued to Asahi-Dow. This patent discloses the preparation of polyphenoxy ethers in the presence of a homogeneous chelate type catalyst comprising at least one divalent manganese salt and at least one selected amino compound. U.S. Pat. No. 3,787,361 issued to Sumitomo Chemical discloses a similar process in the presence of a homogeneous tertiary catalyst system composed of a manganese compound, a primary amine and an alcohol. It is also known that catalyst systems comprising a variety of different metals including manganese, chromium and/or copper have utility in a variety of chemical reactions. For example, U.S. Pat. No. 3,216,954 assigned to E. I. DuPont deNemours and Company discloses catalysts comprising a number of different metals for use in converting combustion products containing nitrogen oxides, carbon monoxide and hydrocarbons.

In accordance with the present invention there has now been discovered a method of preparing a high molecular weight polyphenoxy ether of an alkyl phenol, said method comprising contacting a solution of the alkylphenol with oxygen or an oxygen carrying gas in the presence of an alkaline material selected from the group consisting of alkali metal alkoxides, hydroxides, and alkali metal carbonates, the improvement which comprises reacting the alkyl phenol in the presence of a heterogeneous catalyst system containing mixed oxides of manganese, chromium, and copper supported on activated or precipitated alumina in which the metals are present by weight of the catalyst system from abou 5 to 25 percent chromium, 3 to 15 percent copper and in which the weight ratio range of manganese to chromium is 1.9–0.9 to 1.

An additional advantage of the process of the invention is the ability to selectively control the molecular weight of the polyphenoxy ethers.

DESCRIPTION OF THE INVENTION

Polyphenoxy ethers are prepared by a carbon-oxygen coupling of "alkyl phenols" in accordance with the following general reaction:

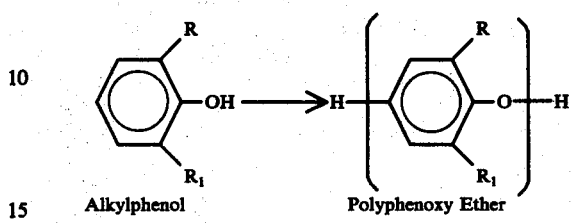

Alkylphenol        Polyphenoxy Ether wherein R is a straight chain alkyl group of from 1 to 5 carbon atoms, $R_1$ may be a primary or secondary alkyl group of from 1 to 5 carbon atoms, and $n$ is an integer.

As used herein, the term high molecular weight polyphenoxy ethers is intended to refer to those materials which have an average molecular weight of no less than about 8,000.

In accordance with the present invention, these polyphenoxy ethers are prepared by introducing oxygen into a reaction mixture comprising an alkylphenol, a solvent for the alkylphenol, an alkaline material and a heterogeneous supported manganese, chromium and copper catalyst. Each of these components is described in detail below.

Alkylphenol

The alkylphenols which may be employed in carrying out the present invention have the following formula:

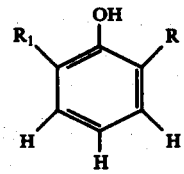

wherein R is a straight chain alkyl group of from 1 to 12 carbon atoms and $R_1$ is a primary or secondary alkyl group of from 1 to 12 carbon atoms.

Useful alkylphenols include for example, 2,6-xylenol, 2-methyl-6-butyl phenol, 2,6-diisobutyl phenol, 2-octyl-6-methyl phenol, 2-isobutyl-6-dodecyl phenol, 2-ethyl-6-methyl phenol, and 2,6-dodecyl phenol.

The preferred dialkyl phenols for use in the present invention are those in which the alkyl groups contain from 1 to about 5 carbon atoms.

Solvent

In carrying out the improved process of the present invention, the alkylphenol is first dissolved in a suitable solvent. Representative organic solvents in which the alkylphenols may be dissolved are the aromatic hydrocarbons, including benzene, toluene, ethylbenzene, xylene, cumene, mesitylene, and the like; the nitrated aromatic hydrocarbons, including nitrobenzene, dinitrobenzene, nitrotoluene, and the like; alicyclic hydrocarbons, including cycloheptane, cyclohexane, and the like; tertiary-butyl alcohol; tertiary-amyl alcohol; dimethylformamide; dimethylsulfoxide; tetrahydrofuran; dioxane; ketones; and esters of lower aliphatic acids. Of these, it is especially preferred to employ the aromatic hydrocarbons.

The amount of solvent employed has not been found to be narrowly critical to the preparation of the polyphenoxy ethers in accordance with the present invention. However, the amount of solvent employed should be sufficient to dissolve the alkyphenol being reacted. For most solvent-alkylphenol mixtures, about 2 ml. of solvent per gram of alkylphenol is sufficient to dissolve the phenol. It has been found that the use of an excess of solvent or the presence of water in the reaction mixture tends to produce ethers of relatively low molecular weights. It is therefore suggested that in order to produce a product having the highest possible molecular weight, only the minimum amount of solvent should be included in the reaction mixture. The actual amount of solvent, in this situation, may vary depending upon the alkylphenol employed, type of stirring, etc. For the same reason it is suggested that a desiccant should be included to absorb any water that may be formed during the reaction.

Catalyst

According to the process of the present invention, the oxidation reaction is carried out in the presence of a catalyst containing mixed oxides of manganese, chromium and copper deposited on activated or precipitated alumina in which the metals are present by weight of the catalyst system from about 5 to 25 percent chromium 3 to 15 percent copper and in which the weight ratio range of manganese to chromium is 1.9–0.9 to 1.

The alumina support for the catalyst may be activated alumina which usually has a high surface area or precipitated alumina which has a lower surface area. Useful activated aluminas include commercially available materials such as Alcoa F-20 alumina and Alcoa H-51 alumina. Precipitated aluminas which may be used in the process of the invention include materials such as Alon C alumina commercially available from the Cabot Corporation. Fibrous alumina such as DuPont's Baymal alumina or ICI's Saffill alumina do not provide effective catalyst supports since their presence inhibits the formation of high molecular weight polyphenoxy ethers. The presence of water during the reaction also detrimentally affects the formation and the molecular weight of the product. Aluminas having surface areas of less than 50–100 m²/gram do not absorb water very effectively and such aluminas are considered less desirable for use in the process of the invention.

The amount of alumina in the catalyst system is not particularly critical provided there is sufficient alumina present to form a support for the metals. The catalysts useful in the process of the invention may be conveniently prepared by stirring a slurry of solid alumina and an aqueous solution of a manganous salt, cupric salt and a hexavalent chromium compound and adding ammonium hydroxide to precipitate the cupric and manganous salts as hydroxides. Converting these hydroxides to mixed oxides is accomplished by calcining the dried slurry in an oven for about 4 hours at 400° C. The manganous and cupric salt may be any organic, nitrate or nitrite salt. Other nonorganic salts such as sulfates should be avoided since such salts do not readily decompose to oxides by calcination at 400° C.

Alkaline Material

In accordance with the present invention, it has been found that satisfactory products can be produced utilizing less catalyst or, when the same amount of catalyst is employed, the yield of product can be improved, by also including an alkaline material in the reaction mixture. The alkaline material useful in achieving the improved results of the present invention is selected from the group consisting of alkali metal hydroxides, and alkali metal carbonates. The alkaline material may be added either as a single compound or as a mixture of compounds.

It has been found that, in most instances, an amount of alkaline material equal to about 0.3% by weight based on the weight of alkylphenol present in the reaction mixture will produce an optimum yield of the polyphenoxy ether. Either less than, or more than, this amount may also be utilized. However, when the highest molecular weight products are desired, an excessive amount of alkaline material should be avoided. Also, if too much alkaline material is utilized, problems such as stirring, etc., may be encountered. The alkaline material may be added to the reaction mixture either alone or combined with the catalyst system.

Amine

The presence of an amine in the reaction mixture although not critical may benefically affect the yield and the molecular weight of the product. The term "amine" is meant to include only primary aliphatic amines, such as n-butylamine; tertiary aliphatic amines, such as triethylamine; heterocyclic amines (cyclic tertiary amines) such as pyridine, 2,-methyl-pyridine, 2,6-lutidine, piperidine and 2,6-dimethylpiperidine. The amount of amine desirable for satisfactory yields of products ranges from 0.1 to 2 mmoles of amine per mole of manganese in the catalyst. The presence of the amine tends to increase the rate of reaction as well as increase the molecular weight of the polymeric products of the reaction. In particular it has been found that an increase in the amount of amine used during the reaction increases the number average molecular weight ($\overline{Mn}$) of the polyphenoxy ethers. Varying the amount of amine relative to the manganese content of the catalyst provides therefore an effective method of controlling the $\overline{Mn}$ of polymers.

Reaction Conditions

The reaction mixture comprising alkylphenol, solvent, catalyst system, and alkaline material is contacted with a suitable oxidizing agent to convert the alkylphenol to the desired product. Oxidizing agents which may be employed in carrying out the present invention include oxygen either alone or as an oxygen-containing gas, such as air. The oxygen may be introduced into the reaction mixture either directly as oxygen gas or as an oxygen-generating material such as ozone, hydrogen peroxide, or an organic peroxide. The amount of oxygen utilized should be sufficient to convert all of the alkylphenol to the desired product. To assure that sufficient oxygen is present, oxygen should be introduced into the reaction mixture continuously during the course of the reaction.

The reaction conditions employed may be varied depending upon the molecular weight of product desired. When it is desired to produce very high molecular weight polyphenoxy ethers, the reaction is preferably conducted at a lower temperature, generally in the range of from about 10° C. to about 20° C. It has been found that the highest molecular weight polyphenoxy ethers are best produced at lower temperatures and that raising the reaction temperature tends to lower the molecular weight of the resulting polyphenoxy ethers. Temperatures other than those mentioned above may be employed. However, conversion to the desired product is generally reduced if the reaction is conducted at such temperatures. The amount of time required for completion of the reaction depends on the temperature employed and the other variables such as the concentration of alkylphenol, the amount of catalyst, and the amount of alkaline material employed. However, it has been found that, in general, the reaction is completed in 6 hours or less.

As will be appreciated by those skilled in the art, the process of the present invention sometimes results in the production of a mixture of products. Some diphenoquinone may be produced, and there may also be included in the product some low molecular weight polyphenoxy ethers. These latter products may be separated and the diphenoquinone purified by procedures which are now well known in the art. These procedures generally take advantage of the fact that the diphenoquinone is soluble in materials in which the low molecular weight product will not dissolve and vice versa. Similarly, when polyphenoxy ethers are prepared, there may result a mixture of products having a variety of average molecular weights. These may also be separated, if desired, as is known to those skilled in the art. This also is done by taking advantage of the relative solubility and insolubility of the several fractions.

The following procedure is representative of those which may be utilized to isolate and separate the products produced in accordance with the present invention.

If a solvent such as an aromatic hydrocarbon in employed, the diphenoquinone, if present, will precipitate during the course of the reaction. The solids are filtered from the reaction mixture and washed with an organic solvent such as benzene, toluene or xylene to remove any unreacted alkylphenol and low molecular weight polyphenoxy ether. The solid diphenoquinone and high molecular weight polyphenoxy ether are then separated from the catalyst by extracting with a suitable solvent, such as methylene chloride, the solution containing high polyphenoxy ether and diphenoquinone is allowed to stand. The high molecular weight polyphenoxy ethers then precipitates as the methylene chloride complex. The complex is then filtered and dissolved in trichloroethylene and the solution is added to stirred acetone to precipitate the high molecular weight polymer.

In order to describe the present invention so that it may be more clearly understood, the following examples are set forth. These examples are given primarily for the purpose of illustration and any enumeration of detail contained therein should not be interpreted as a limitation on the concept of the present invention.

As used herein, the term mol percent refers to:

$$\frac{\text{mols of product (actual)}}{\text{mols of product (theoretical)}} \times 100$$

The molecular weights were determined by gel permeation chromatography.

EXAMPLE 1

Catalyst Preparation

In three separate flasks were added 48 grams of Cu(NO3)$_2$3H$_2$O dissolved in 250 ml of water and 4 ml of concentrated HNO$_3$ to achieve complete solution, 96 grams of Mn(CH$_3$COO)$_2$. 4H$_2$O dissolved in 250 ml of water and 60 grams of CrO$_3$ also dissolved in 250 ml of water. The copper salt and chromic oxide were obtained from Baker Company and the manganese salt was obtained from Ventron Company. The three separate solutions were poured into a large mixing container and stirred with 40 grams of Alon C alumina. Over a period of 10–15 minutes 140 ml of concentrated ammonium hydroxide (28 percent) was also added. The temperature rose to about 50° centigrade and then was further increased to 80° C. and the slurry was vigorously stirred for about 1 hr. at 80° C. The slurry was then filtered and washed with 500 ml of water, dried at 140° C. for several hours and then subsequently calcined at 400° C. for 4 hrs. The dried product was poured into a container while still hot and stored under conditions to exclude moisture. Upon analysis the product showed that it contained 12.2 percent of manganese, 13.9 percent of chromium and 8.46 percent of copper. The manganese to chromium ratio was 0.88 to 1.

EXAMPLE 2

Following the procedure of Example 1 a catalyst was prepared differing only in that Alcoa F-20 alumina was used instead of Alon C alumina upon analysis, this catalyst showed that it contained 13.6 percent manganese, 13.4 percent chromium and 9.6 percent copper. The manganese to chromium ratio was 1.01 to 1.

EXAMPLE 3

Following the procedure of Example 1 a catalyst was prepared differing only in that Alcoa H-51 alumina was used instead of Alon C alumina. This catalyst, upon analysis, showed that it contained 14.7 percent manganese, 14 percent chromium and 8.4 percent copper. The manganese to chromium ratio was 1.05 to 1.

EXAMPLE 4

Following the procedure of Example 1 a catalyst was prepared differing only in that Harshaw alumina was used instead of Alon C alumina. This catalyst, upon analysis, showed that it contained 15.9 percent of manganese, 14 percent of chromium and 9.6 percent of copper. The manganese to chromium ratio was 1.14 to 1.

EXAMPLE 5

Following the procedure of Example 1 a catalyst was prepared upon analysis differing only in that the slurry was stirred for 45 minutes instead of an hour and in that 1000 ml water was used to wash the filtered slurry. This catalyst showed that it contained 14.9 percent manganese, 13.8 percent chromium, and 9.2 percent copper. The manganese to chromium ratio was 1.08 to 1.

EXAMPLE 6

Following the procedure of Example 2 a catalyst was prepared differing only in that an excess of ammonia (an additional 50 ml) was used during the procedure. The catalyst upon analysis showed that it contained 19.5 percent manganese, 10.6 percent chromium and 3.6 percent copper. The manganese to chromium ratio was 1.84 to 1.

EXAMPLE 7

Into three separate flasks were added 24 grams of Cu(NO$_3$)$_2$ 3H$_2$O dissolved in 125 ml of water and 2 ml of concentrated HNO$_3$ to achieve complete solution, 48 grams of Mn(CH$_3$COO)$_2$.4H$_2$O dissolved in 125 ml of water and 30 grams of CrO$_3$ also dissolved in 125 ml of water. The copper salt and chromic oxide were obtained from Baker Company and the manganese salt was obtained from Ventron Company. The three separate solutions were poured into a large mixing container and stirred with 20 grams of Alon C alumina. Over a period of 10-15 minutes 70 ml of concentrated ammonium hydroxide (28 percent) was also added. The temperature rose to about 50 centigrade and then was further increased to 80° C. and the slurry was vigorously stirred for about 1 hr. at 80° C. The slurry was then filtered and washed with 500 ml of water, dried at 140° C. for several hours and then subsequently calcined at 400° C. for 4 hrs. The dried product was poured into a container while still hot and stored under conditions to exclude moisture. Upon analysis the product showed that it contained 16.8 percent of manganese, 14.7 percent of chromium and 9.4 percent of copper. The manganese to chromium ratio was 1.14 to 1.

EXAMPLE 8

Charge

Into a 500 ml flask fitted with a gas addition tube, a condenser, a thermometer and a stirrer, there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 2 was stirred with 5 gm of 100-200 mesh activated alumina (Alcoa's F-20) in about 30 ml of toluene solvent. After further stirring the catalyst mixture was added to the phenol mixture and rinsed in with the remainder of solvent. Total amount of solvent was about 100 ml of toluene. The mixture was stirred further for about 5-15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

The portion, which was insoluble in toluene contained both catalyst, tetramethyldiphenoquinone and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer $.CH_2Cl_2$ complex was removed. The complex was stirred with trichloroethylene to dissolve the polymer. The polymer solution was added to 500 ml of stirred acetone to precipitate the polymer. After washing with additional acetone the high molecular weight polymer was dried. The process yielded 59.3 mol percent of product having a $\overline{Mn}$ of 41,900, and a $\overline{Mw}$ of 139,000 ($\overline{Mn}$ indicates number average molecular weight and $\overline{Mw}$ indicates weight average molecular weight).

EXAMPLE 9

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 3 was stirred with 5 gm of activated alumina (Alcoa's F-20) in about 30 ml of toluene solvent. To the stirred catalyst mixture was added 0.75 ml (9.25 mmoles) of pyridine in about 10 ml of toluene solvent. After further stirring the catalyst amine mixture is added to the phenol mixture and rinsed in with the remainder of solvent. Total amount of solvent was about 100 ml of toluene. The mixture was stirred further for about 5-15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

The portion which was insoluble in toluene, contained catalyst, diphenoquinone and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer $.CH_2Cl_2$ complex was removed. The complex was washed and stirred with trichloroethylene to dissolve the polymer. The polymer solution was added to 500 ml of stirred acetone to precipitate the polymer. After washing with additional acetone the high molecular weight polymer was dried. The process yielded 21.6 mol percent of a product having a $\overline{Mn}$ of 28,400 and a $\overline{Mw}$ of 119,00.

EXAMPLE 10

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 4 was stirred with 5 gm of activated alumina (Alcoa's F-20) in about 30 ml of toluene solvent. To the stirred catalyst mixture was added 0.75 ml (9.25 mmoles) of pyridine in about 10 ml of toluene solvent. After further stirring the catalyst amine mixture was added to the phenol mixture and rinsed with the remained of solvent. Total amount of solvent was about 100 ml of toluene. The mixture was stirred further for about 5–15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion, which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer $.CH_2Cl_2$ complex was removed. The complex was washed and stirred with trichloroethylene to dissolve the polymer. The polymer solution was added to 500 ml of stirred acetone to precipitate the polymer. After washing with additional acetone the high molecular weight polymer was dried. The process yielded 25 mol percent of product having a $\overline{Mn}$ of 29,000 and a $\overline{Mw}$ of 108,000.

EXAMPLE 11

Charge

Into a 500 ml., flask fitted with a gas addition tube, a condenser, a thermometer and a stirrer there was added 24.4 grams of 2.6 xylenol dissolved in 40 ml of toluene. There was then added 0.40 grams (6.4 mmoles) of powdered 85% potassium hydroxide. The mixture was stirred at room temperature under nitrogen for about 5–10 minutes until the potassium hydroxide was dissolved.

In another vessel 5 grams of the catalyst prepared according to the procedure of Example 5 was stirred with 5 gm of activated alumina (Alcoa's F-20) in about 30 ml of toluene solvent. To the stirred catalyst mixture was added 0.75 ml (9.25 mmoles) of pyridine in about 10 ml of toluene solvent. After further stirring the catalyst amine mixture was added to the phenol mixture and rinsed in with the remainder of solvent. Total amount of solvent was about 100 ml of toluene. The mixture was stirred further for about 5–15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion, which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer complex was removed. The complex was washed and stirred with trichloroethylene to dissolve the polymer. The polymer solution was added to 500 ml of stirred acetone to precipitate the polymer. After washing with additional acetone the high molecular weight polymer was dried. The process yielded 74.5 mol percent of product having a $\overline{Mn}$ of 40,800 and $\overline{Mw}$ of 193,000.

EXAMPLE 12

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5–10 minutes until the potassium hydroxide was dissolved.

In another vessel 5 grams of the catalyst prepared according to the procedure of Example 6 was stirred with 5 gm of activated alumina (Alcoa's F-20) in about 30 ml of toluene solvent. After further stirring the catalyst mixture was added to the phenol mixture and rinsed with the remainder of solvent. Total amount of solvent was about 100 ml of toluene. The mixture was stirred further for about 5–15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

The portion, which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer $.CH_2Cl_2$ complex was removed. The complex was washed and stirred with trichloroethylene to dissolve the polymer. The polymer solution was added to 500 ml of stirred acetone to precipitate the polymer. After washing with additional acetone the high molecular weight polymer was dried. The process yielded 23.8 mol percent of product having a $\overline{Mn}$ of 37,000 and a $\overline{Mw}$ of 93,700.

EXAMPLE 13

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5–10 minutes until the potassium hydroxide was dissolved.

In another vessel 7.5 grams of the catalyst prepared according to the procedure of Example 7 was stirred with 10 gm of activated alumina (Alcoa's F-20) in about 30 ml of toluene solvent. To the stirred catalyst mixture was added 13.5 mmoles of pyridine in about 10 ml of toluene solvent. After further stirring the catalyst-amine was added to the phenol mixture and rinsed in with the remainder of the solvent. Total amount of solvent was about 100 ml of toluene. The mixture was stirred further for about 5–15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion, which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer complex was removed. The complex was washed with .CH$_2$Cl$_2$ and stirred with trichloroethylene to dissolve the polymer. The polymer solution was added to 500 ml of stirred acetone to precipitate the polymer. After washing with additional acetone the high molecular weight polymer was dried. The process yielded 82.5 mol percent of product having a M̄n of 38,500 and M̄w of 180,000.

EXAMPLE 14

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5–10 minutes until the potassium hydroxide was dissolved.

In another vessel 10 grams of the catalyst prepared according to the procedure of Example 7 was stirred with 10 gm of activated alumina (Alcoa's F-20) in about 30 ml of toluene solvent. To the stirred catalyst mixture was added 18.5 mmoles of pyridine in about 10 ml of toluene solvent. After further stirring the catalyst amine mixture was added to the phenol mixture and rinsed in with the remainder of solvent. Total amount of solvent was about 100 ml of toluene. The mixture was stirred further for about 5–15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion, which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer .CH$_2$Cl$_2$ complex was removed. The complex was washed and stirred with trichloroethylene to dissolve the polymer. The polymer solution was added to 500 ml of stirred acetone to precipitate the polymer. After washing with additional acetone the high molecular weight polymer was dried. The process yielded 60 mol percent of product having a M̄n of 42,000 and a M̄w of 202,000.

EXAMPLE 15

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5–10 minutes until the potassium hydroxide was dissolved.

In another vessel 5 grams of the catalyst prepared according to the procedure of Example 7 was stirred with 15 gm of activated alumina (Alcoa's F-20) in about 30 ml of toluene solvent. To the stirred catalyst mixture was added 0.75 ml (9.25 mmoles) of pyridine in about 10 ml of toluene solvent. After further stirring the catalyst amine mixture was added to the phenol mixture and rinsed in with the remainder of the solvent. Total amount of solvent was about 100 ml of toluene. The mixture was stirred further for about 5–15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. This viscous mixture was stirred with 200 ml of toluene and the insoluble portion removed after centrifuging.

This portion, which was insoluble in toluene, contained both catalyst and high molecular polymer. After adding 250 ml of methylene chloride the mixture was stirred and then centrifuged. The solid was stirred with additional methylene chloride and centrifuged again. The methylene chloride solution was allowed to stand after which the solid polymer complex was removed. The complex was washed and stirred with trichloroethylene to dissolve the polymer. The polymer solution was added to 500 ml of stirred acetone to precipitate the polymer. After washing with additional acetone the high molecular weight polymer was dried. The process yielded 76 mol percent of a product having a $\overline{Mn}$ of 14,100 and $\overline{Mw}$ of 133,000.

EXAMPLE 16

Charge

Into a 500 ml. flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 1 was stirred with 5 gm of alumina (Cabot's precipitated Alon) in about 30 ml of toluene solvent. To the stirred catalyst mixture was added 12.35 mmoles of pyridine in about 10 ml of toluene solvent. After further stirring the catalyst amine mixture was added to the phenol mixture and rinsed in with the remainder of the solvent. Total amount of solvent was about 100 ml of toluene. The mixture was stirred further for about 5-15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion, which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer .CH$_2$Cl$_2$ complex was removed. The complex was washed and stirred with trichloroethylene to dissolve the polymer. The polymer solution was added to 500 ml of stirred acetone to precipitate the polymer. After washing with additional acetone the high molecular weight polymer was dried. The process yielded 65 mol percent of product having a $\overline{Mn}$ of 53,600 and $\overline{Mw}$ of 221,000.

EXAMPLE 17

Charge

Into a 500 ml., flask fitted with a gas addition tube, a condenser, a thermometer and a stirrer capable of operating at speeds in the range of 8,000 to 10,000 r.p.m., there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 1 was stirred with 5 gm of activated alumina (Alcoa's F-20) in about 30 ml of toluene solvent. To the stirred catalyst mixture was added 12 mmoles of 2-methylpyridine in about 10 ml of toluene solvent. After further stirring the catalyst amine mixture was added to the phenol mixture and rinsed with the remainder of solvent. Total amount of solvent was about 100 ml of toluene. The mixture was stirred further for about 5-15 minutes, after which the stirrer was stopped and the apparatus was flushed with oxygen at 20° C. for about 25 minutes at which time the nitrogen was totally flushed out.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion, which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer .CH$_2$Cl$_2$ complex was removed. The complex was washed and stirred with trichloroethylene to dissolve the polymer. The polymer solution was added to 500 ml of stirred acetone to precipitate the polymer. After washing with additional acetone the high molecular weight polymer was dried. The process yielded 69.2 mol percent of a product having a $\overline{Mn}$ of 39,500 and a $\overline{Mw}$ of 169,000.

EXAMPLE 18

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 1 was stirred with 5 gm of activated alumina (Alcoa's F-20) in about 30 ml of toluene solvent. To the stirred catalyst mixture was added 12.4 mmoles of 2,6-lutidine in about 10 ml of toluene solvent. After further stirring the catalyst amine mixture was added to the phenol mixture and rinsed in with the remained of solvent. Total amount of solvent was about 100 ml of toluene. The mixture was stirred further for about 5-15 minutes, after which the stirrer was stopped and the apparatus was flushed with oxygen at 20° C. for about 25 minutes at which time the nitrogen was totally flushed.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion, which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer .CH$_2$Cl$_2$ complex was removed. The complex was washed and stirred with trichloroethylene to dissolve the polymer. The polymer solution was added to 500 ml of stirred acetone to precipitate the polymer. After washing with additional acetone the high molecular weight polymer was dried. The process yielded 40.8 mol percent of a product having a $\overline{M}n$ of 23,300 and a $\overline{M}w$ of 155,000.

EXAMPLE 19

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 1 was stirred with 5 gm of activated alumina (Alcoa's F-20) in about 30 ml of toluene solvent. To the stirred catalyst mixture was added 12.4 mmoles of n-butylamine in about 10 ml of toluene solvent. After further stirring the catalyst amine mixture was added to the phenol mixture and rinsed in with the remainder of the solvent. Total amount of solvent was about 100 ml of toluene. The mixture was stirred further for about 5-15 minutes, after which the stirrer was stopped and the apparatus was flushed with oxygen at 20° C. for about 25 minutes at which time the nitrogen was totally flushed.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer .CH$_2$Cl$_2$ complex was removed. The complex was washed and stirred with trichloroethylene to dissolve the polymer. The polymer solution was added to 500 ml of stirred acetone to precipitate the polymer. After washing with additional acetone high molecular weight polymer was dried. The process yielded 83.7 mol percent of a product having a $\overline{M}n$ of 33,000 and a $\overline{M}w$ of 144,000.

EXAMPLE 20

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 1 was stirred with 5 gm of activated alumina (Alcoa's F-20) in about 30 ml of toluene solvent. To the stirred catalyst mixture was added 12.4 mmoles triethylamine in about 10 ml of toluene solvent. After further stirring the catalyst amine mixture was added to the phenol mixture and rinsed in with the remainder of the solvent. Total amount of solvent was about 100 ml of toluene. The mixture was stirred further for about 5-15 minutes, after which the stirrer was stopped and the apparatus was flushed with oxygen at 20° C. for about 25 minutes at which time the nitrogen was totally flushed.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion, which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer .CH$_2$Cl$_2$ complex was removed. The complex was washed and stirred with trichloroethylene to dissolve the polymer. The polymer solution was added to 500 ml of stirred acetone to precipitate the polymer. After washing with additional acetone high molecular weight polymer was dried. The process yielded 84 mol percent of a product having a $\overline{M}n$ of 22,400 and a $\overline{M}w$ of 103,000.

EXAMPLE 21

Charge

Into a 500 ml., flask fitted with a gas addition tube, a condenser, a thermometer and a stirrer there was added 24.4 grams of 2,6-xylenol dissolved in 40 ml of toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 1 was stirred with 5 gm of activated alumina (Alcoa's F-20) in about 30 ml of toluene solvent. To the stirred catalyst mixture was added 12.4 mmoles of piperidine in about 10 ml of toluene solvent. After further stirring the catalyst amine mixture was added to the phenol mixture and rinsed with the remainder of solvent. Total amount of solvent was about 100 ml of toluene. The mixture was stirred further for about 5-15 minutes, after which the stirrer was stopped and the apparatus was flushed with oxygen at 20° C. for about 25 minutes at which time the nitrogen was totally flushed.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The isolation was turned off and the mixture was briefly flushed with nitrogen. The viscous mixture was stirred with 200 ml of toluene and the insoluble portion removed after centrifuging.

This portion which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer .$CH_2Cl_2$ complex was removed. The complex was washed and stirred with trichloroethylene to dissolve the polymer. The polymer solution was added to 500 ml of stirred acetone to precipitate the polymer. After washing with additional acetone high molecular weight polymer was dried. The process yielded 61.8 mol percent of a product having a $\overline{Mn}$ of 20,100 and a $\overline{Mw}$ of 127,000.

EXAMPLE 22

Charge

Into a 500 ml. flask fitted with a gas addition tube, a condenser, a thermometer and a stirrer toluene. There was then added 0.40 grams (6.4 mmoles) of powdered 85% potassium hydroxide. The mixture was stirred at room temperature under nitrogen for about 5-10 minutes until the potassium hydroxide was dissolved.

In another vessel 5 grams of the catalyst prepared according to the procedure of Example 1 was stirred with 5 gm of activated alumina (Alcoa's F-20) in about 30 ml of toluene solvent. To the stirred catalyst mixture was added 12.4 mmoles 2,6-dimethylpiperidine in about 10 ml of toluene solvent. After further stirring the catalyst-amine mixture was added to the phenol mixture and rinsed in with the remainder of the solvent. Total amount of solvent was about 100 ml of toluene. The mixture was stirred further for about 5-15 minutes, after which the stirrer was stopped and the apparatus was flushed with oxygen at 20° C. for about 25 minutes at which time the nitrogen was totally flushed.

Reaction

The oxygen flush was halted and the stirrer was turned on. The reaction temperature of about 25° C. was maintained by a cooling bath. Oxygen was fed into the reactor zone from a gas buret such that the volume of oxygen consumed could be read at any time. The reaction continued for about 6 hours.

Product Isolation

The oxygen was turned off and the mixture was briefly flushed with nitrogen. The viscous mixture was stirred with 200 ml of toluene and the insoluble portion removed after centrifuging.

This portion which was insoluble in toluene, contained both catalyst and high molecular weight polymer. After adding 250 ml of methylene chloride the mixture was stirred and then centrifuged. The solid was stirred with additional methylene chloride and centrifuged again. The methylene chloride solution was allowed to stand after which the solid polymer .$CH_2Cl_2$ complex was removed. The complex was washed and stirred with trichloroethylene to dissolve the polymer. The polymer solution was added to 500 ml of stirred acetone to precipitate the polymer. After washing with additional acetone high molecular weight polymer was dried. The process yielded 48 mol percent of a product having a Mn of 14,000 and a Mw of 58,300.

What is claimed is:

1. In a method of preparing a high molecular weight polyphenoxy ether of an "alkyl phenol", said method comprising contacting a solution of the alkyl phenol with oxygen or an oxygen carrying gas in the presence of an alkaline material selected from the group consisting of alkali metal alkoxides hydroxides and alkali metal carbonates, the improvement which comprises reacting the alkyl phenol in the presence of a catalyst containing mixed oxides of manganese, chromium, and copper supported on activated or precipitated alumina in which the metals are present by weight of the catalyst from about 5 to 25 percent chromium, 3 to 15 percent copper and in which the weight ratio range of manganese to chromium is 1.9-0.9 to 1.

2. A method as claimed in claim 1 wherein the alumina is activated alumina.

3. A method as claimed in claim 1 wherein the alkaline material is potassium hydroxide.

4. A method as claimed in claim 1 wherein the alkyl group of the alkyl phenol contains from 1 to about 5 carbon atoms.

5. A method as claimed in claim 1 wherein the alkyl phenol is dissolved in an aromatic hydrocarbon.

6. A method as claimed in claim 5 wherein the aromatic hydrocarbon is xylene.

7. A method as claimed in claim 5 wherein the aromatic hydrocarbon is toluene.

8. A method as claimed in claim 1 wherein the amount of catalyst is equal to from about 10 to 20 percent by weight of alkyl phenol in the solution.

9. A method as claimed in claim 3 wherein the amount of potassium hydroxide is equal to about 0.8 to 3.2 percent by weight of alkyl phenol in the solution.

10. A method as claimed in claim 1 wherein the reaction is carried out at a temperature of from about 0° C. to about 50° C.

11. A method as claimed in claim 9 wherein the amount of potassium hydroxide is equaled to from about 0.8 to 2 percent by weight based on the weight of the alkyl phenol in the solution.

12. A method as claimed in claim 1 wherein the solution additionally contains an amine compound.

13. A method as claimed in claim 12 wherein the amine is pyridine.

14. A method as claimed in claim 12 wherein the amine is piperidine.

15. A method as claimed in claim 12 wherein the amine is 2,6-dimethylpiperidine.

16. A method as claimed in claim 12 wherein the amine is an aliphatic amine.

17. A method as claimed in claim 12 wherein the amine is triethylamine.

* * * * *